United States Patent [19]

Hasegawa et al.

[11] Patent Number: 5,325,346
[45] Date of Patent: Jun. 28, 1994

[54] DIGITAL SERVO APPARATUS FOR OPTICAL DISC PLAYER

[75] Inventors: Kiyomasa Hasegawa, Chiba; Takeshi Sasaki; Hidenobu Noda, both of Kanagawa, all of Japan

[73] Assignee: Sony Corporation, Tokyo, Japan

[21] Appl. No.: 967,274

[22] Filed: Oct. 26, 1992

[30] Foreign Application Priority Data

Oct. 29, 1991 [JP] Japan .................. 3-311763

[51] Int. Cl.$^5$ .............................................. G11B 7/00
[52] U.S. Cl. .............................. 369/44.28; 369/44.34
[58] Field of Search ............... 369/44.28, 44.34, 44.13, 369/44.25, 44.29; 360/75, 77.13, 77.01, 77.05, 77.06, 77.07, 78.05, 78.06, 78.14

[56] References Cited

U.S. PATENT DOCUMENTS

| | | | |
|---|---|---|---|
| 5,095,394 | 3/1992 | Yanagihara | 360/77.14 |
| 5,157,645 | 10/1992 | Takahara et al. | 369/44.34 |
| 5,221,896 | 6/1993 | Kobayashi et al. | 324/207.17 |

FOREIGN PATENT DOCUMENTS

| | | | |
|---|---|---|---|
| 0176185A1 | 4/1986 | European Pat. Off. | G11B 21/08 |
| 0255918A2 | 2/1988 | European Pat. Off. | |
| 0283304A2 | 9/1988 | European Pat. Off. | |

OTHER PUBLICATIONS

Patent Abstracts of Japan, vol. 9, No. 62 (P-342), Mar. 19, 1985 & JP-A-59 195 343 (Olympus), Nov. 6, 1984.
Patent Abstracts of Japan, vol. 8, No. 42 (P-256), Feb. 23, 1984 & JP-A-58 194 170 (Denshi Keisanki Kihon Gijutsu Kenkiyuu Kumiai), Nov. 12, 1983.

*Primary Examiner*—Andrew L. Sniezek
*Assistant Examiner*—Thang V. Tran
*Attorney, Agent, or Firm*—Charles P. Sammut

[57] ABSTRACT

A track traverse detecting circuit for generating a count-out signal with precision in addressing high-speed traverse operations appropriately. The circuit includes a tracking zero cross (TZC) signal generating circuit, two delay circuits, an edge detecting circuit and a mirror signal generating circuit. The TZC signal generating circuit generates a TZC signal at the zero cross timing of a tracking error signal. The TZC signal is then delayed by one of the two delay circuits by an appropriate time in accordance with the traverse speed for access to a desired track. Edges of the delayed TZC signal are detected by the edge detecting circuit. A mirror signal output by the mirror signal generating circuit is sampled at the timing of the detected TZC signal edges. The output of the sampling is provided accurately as the count-out signal.

2 Claims, 4 Drawing Sheets

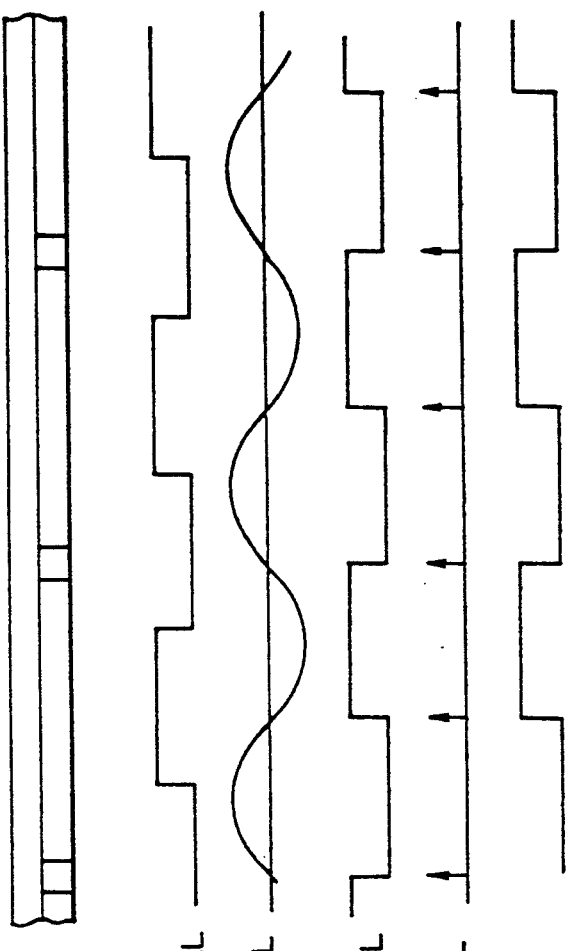

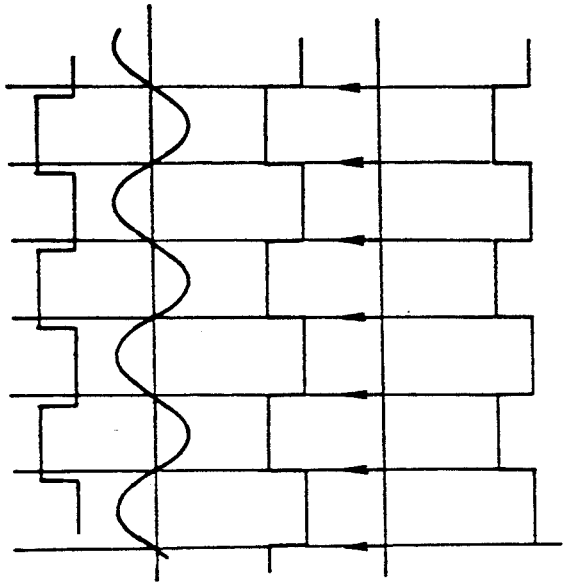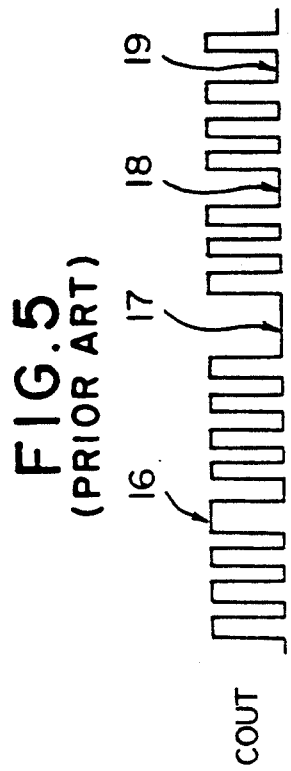
FIG. 4A  MIRROR SIGNAL
FIG. 4B  TE SIGNAL
FIG. 4C  TZC SIGNAL
FIG. 4D  TZC EDGE SIGNAL
FIG. 4E  COUT
(PRIOR ART)
FIG. 5
(PRIOR ART)

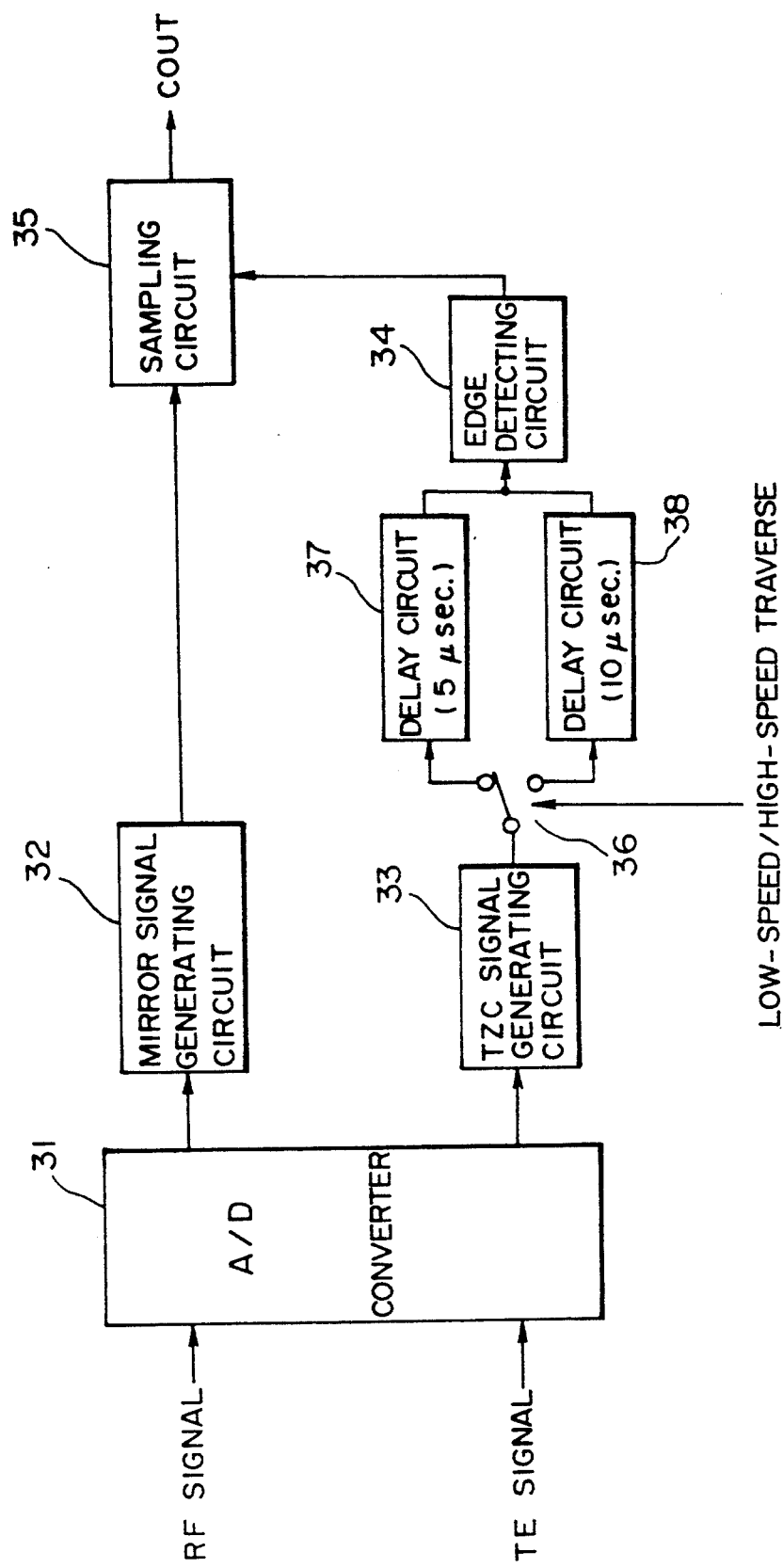

DIGITAL SERVO APPARATUS FOR OPTICAL DISC PLAYER

BACKGROUND OF THE INVENTION

1. Field of the Invention

The present invention relates to a digital servo apparatus for optical disc players and, more particularly, to a track traverse detecting circuit contained in the digital servo apparatus to detect the traverse operation of an optical pickup spot across tracks (i.e., pit arrays) on an optical disc.

2. Description of the Prior Art

When starting to play back a disc, optical disc players such as CD players read and store beforehand TOC (table of contents) data from a read-in area of the currently set disc. Upon access to a desired track based on a search command, the microcomputer in the optical disc player first calculates the currently read sub-code Q data to find the current track number and then the number of the desired track. The difference between the two track numbers allows the microcomputer to find the number of tracks to be jumped. Accordingly the microcomputer drives the optical system of the player to jump the calculated number of tracks in order to reach the target track. The need to count the number of tracks jumped upon jump operation requires detecting the traverse operation of the optical pickup spot across tracks. FIG. 1 is a block diagram of a prior art tracking servo system for controlling the jump operation. In FIG. 1, the information recorded on a disc 1 is read by an optical pickup 2. The read RF signal is sent to a demodulating system, not shown, via an RF amplifier 3 as well as to a track traverse detecting circuit 4.

A tracking error signal generating circuit 5 generates a tracking error (TE) signal based on the output of the pickup 2. Generated by the known three-beam generation method or the like, the TE signal has a S-curve characteristic. The TE signal is then fed to the track traverse detecting circuit 4. In turn, the track traverse detecting circuit 4 generates a count-out signal Cout based on the RF signal and TE signal. The count-out signal Cout is a signal that indicates the traverse operation of the optical pickup spot across a track. The signal Cout is supplied to μCPU (microcomputer) 6.

The μCPU 6 counts the count-out signal Cout that is generated every time the optical pickup spot traverses a track. When the count value coincides with the track count held beforehand in a register in keeping with the search target address, the μCPU 6 issues a jump stop command to a tracking controller 7. Accordingly the tracking controller 7 operates a tracking actuator, not shown, in the pickup 2 through an actuator driver 8.

FIG. 2 is a clock diagram of the typical prior art track traverse detecting circuit 4. In FIG. 2, the RF signal and TE signal are digitized by an A/D converter 11 before they are sent to a mirror signal (mirror face detection signal) generating circuit 12 and a TZC (tracking zero cross) signal generating circuit 13. The mirror signal generating circuit 12 generates a high-level mirror signal ( a ) ( see FIG. 3) by detecting a mirror face between tracks (pit arrays) on the disc 1.

The mirror signal (a) is a signal which goes High when the optical spot is irradiated at a disc mirror face (area between tracks or pit arrays), and which goes Low when the optical spot is irradiated at a track. A TZC signal (c) is generated when the sign bit of the TE signal (b) is captured, the TE signal representing the deviation of the optical spot from any of the tracks or from any mirror area therebetween. When the TE signal (b) is zero, i.e., when the optical spot is located precisely on a track or on a mirror face, the TZC signal (c) goes from High to Low or vice versa.

During a traverse operation, a TZC edge signal (d) is generated at the time when a midpoint is reached between a High and a Low period of the mirror signal. This is how the phase difference becomes substantially 90 degrees between mirror signal (a) and TZC signal (c). In a digitized setup, however, the delay resulting from the sampling by the A/D converter and the delay stemming from a noise-reducing LPF (low pass filter) combine to delay the mirror signal (a) in phase.

The TZC signal generating circuit 13 generates the TZC signal (c) by detecting the zero cross timing of the TE signal (b). The TZC (c) signal is supplied to an edge detecting circuit 14. The edge detecting circuit 14 detects leading and trailing edges of the TZC signal (c). The TZC edge signal (d) output by the edge detecting circuit 14 is fed as a sampling signal to a sampling circuit 15 for sampling of the mirror signal (a). The output of the sampling circuit 15 is provided as the count-out signal Cout (e) which is a track traverse signal.

The growing use of digital servo circuits today requires the mirror signal (a) to be generated by a mirror signal generating circuit 12 of a digital circuit construction, as described. In such cases, the generation timing of the mirror signal (a) is delayed illustratively by two factors, the first being the delay from the sampling of the A/D converter 11, the other being the delay due to a noise-reducing LPF (low pass filter) in the mirror signal generating circuit 12. Theoretically, there should be the 90-degree phase difference between mirror signal (a) and TZC signal (c), as shown in FIG. 3.

For the reasons described, the generation timing of the mirror signal (a) tends to be delayed. This poses no serious problem when the traverse speed is not very high during track search. However, as the traverse speed is increased, a delayed-mirror signal (a) develops a disturbed phase relationship relative to the TZC signal (c). When the traverse speed is very high, the TZC signal (c) can overtake the mirror signal (a) in phase.

At low-speed traverse time, the delay of the mirror signal (a) is negligible with respect to its pulse width, as shown in FIG. 3. As the traverse speed is increased, the pulse width of the mirror signal (a) is reduced. This raises the delay ratio of the mirror signal (a) with respect to its pulse width. In turn, the phase difference becomes smaller than the theoretical 90 degrees between mirror signal (a) and TZC signal (c).

The signal Cout is obtained by sampling the mirror signal (a) using the TZC edge signal (d). Since what needs to be accomplished here is for the microprocessor to count the number of tracks traversed, there is no intrinsic need for the 90 degree phase difference to be maintained between mirror signal (a) and TZC signal (c). However, as the traverse speed is made still higher, with the result that edges of the mirror signal are delayed relative to the TZC signal (c), the signal Cout tends to develop missing edges. This means that the ,microprocessor is now incapable of accurately counting the number of traversed tracks.

At high-speed traverse time in particular, the count-out signal Cout is most likely to develop missing edges, as illustrated by the signal Cout at 16, 17, 18 and 19 FIG. 5. This phenomenon, making it impossible to count the number of traversed tracks accurately, exemplifies the inability of the prior art to acquire precise track counts. This is a major impediment to the accurate provision of track-related control functions including track indexing.

OBJECT AND SUMMARY OF THE INVENTION

It is therefore an object of the present invention to provide a track traverse detecting circuit for an optical disc player, the circuit being capable of generating the count-out signal Cout with precision in addressing high-speed traverse operations appropriately.

In carrying out the invention and according to one aspect thereof, there is provided a track traverse detecting circuit incorporated in the digital servo apparatus of an optical disc player, the track traverse detecting circuit comprising: a mirror face detecting circuit for generating a mirror face detection signal based on a read RF signal coming from an optical disc; a tracking zero cross detecting circuit for generating a tracking zero cross signal by detecting the zero cross timing of a tracking error signal; a delay circuit for delaying the tracking zero cross signal by a predetermined time; and a sampling circuit for sampling the mirror face detection signal at the timing of edges of the tracking zero cross signal having passed the delay circuit; wherein the output of the sampling circuit is provided as a track traverse detection signal.

In operation, the track traverse detecting circuit in the digital servo circuit delays the TZC signal by the appropriate predetermined time. This delay operation compensates for the amount of delay attributed to the delay stemming from the sampling of the mirror signal as well as to the delay resulting from the noise-reducing LPF incorporated. With the signal delay compensated, high-speed traverse operations are adequately addressed; there is no possibility of the TZC signal overtaking the mirror signal even at high-speed traverse time. The invention thus allows the count-out signal Cout to be generated accurately.

These and other objects, features and advantages of the invention will become more apparent upon a reading of the following description and appended drawings.

BRIEF DESCRIPTION OF THE DRAWINGS:

FIGS. 3A, 3B, 3C, 3D and 3E illustrate a view of signal waveforms in effect at low-speed traverse time in connection with the track traverse detecting circuit of FIG. 2;

FIGS. 4A, 4B, 4C, 4D, and 4E illustrate a view of signal waveforms in effect at high-speed traverse time in connection with the track traverse detecting circuit of FIG. 2;

FIG. 5 is a view illustrating a count-out signal with some missing edges in effect at high-traverse time; and FIG. 6 is a block diagram of a track traverse detecting circuit for use in the tracking servo system, the circuit being practiced as the preferred embodiment of the invention.

DESCRIPTION OF THE PREFERRED EMBODIMENTS

Figure 1:
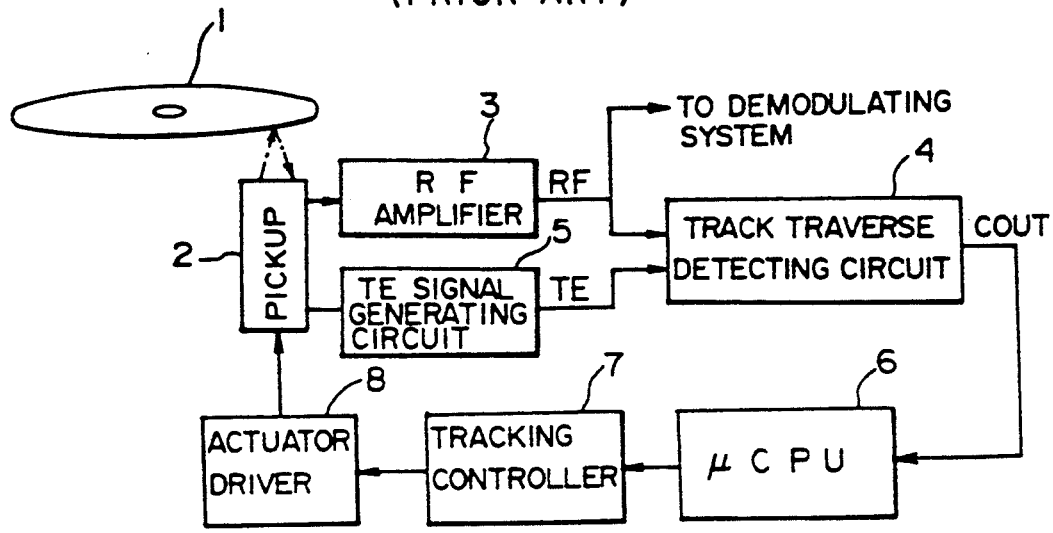
FIG. 1 is a block diagram of a typical tracking servo system for optical disc apparatuses.
Figure 2:
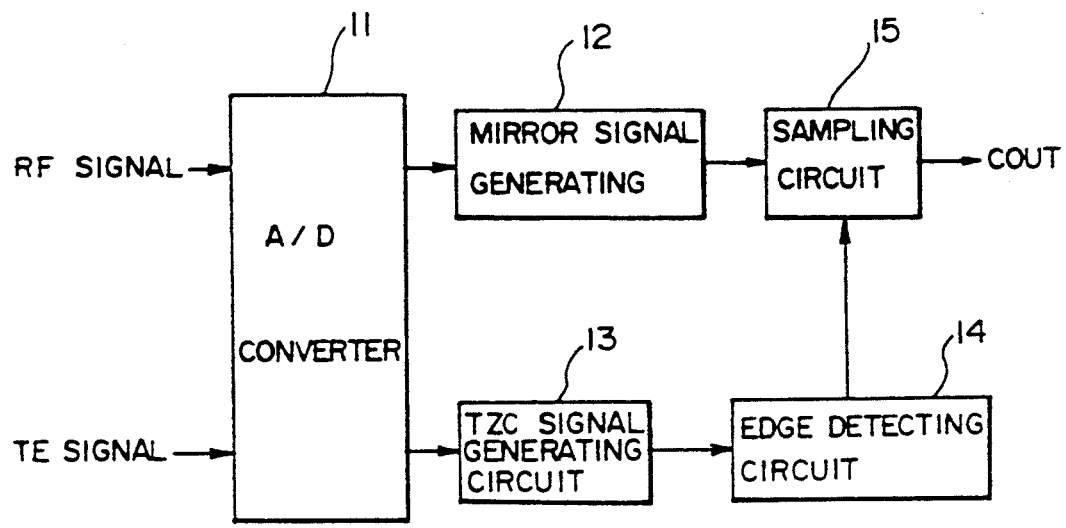
FIG. 2 is a block diagram of a typical prior art track traverse detecting circuit incorporated in the tracking servo system of FIG. 1; .

One preferred embodiment of the invention will now be described with reference to the accompanying drawings. FIG. 6 is a block diagram of a track traverse detecting circuit practiced as the preferred embodiment of the invention. Between the embodiment and the prior art example, repetitive descriptions of like or corresponding parts are abbreviated. In the embodiment of FIG. 6, delay circuits 37 and 38 are provided on the output side of a TZC signal generating circuit 33. Either of the delay circuit 37 and 38 is supplied with a TZC signal selectively from the TZC signal generating circuit 33 via a changeover switch 36. The rest of the circuit configuration is the same as that of the prior art example.

The delay circuits 37 and 38 illustratively have delay times of 5 $\mu$sec. and 10 $\mu$sec., respectively. The TZC signal output by the TZC signal generating circuit 33 is switched by the changeover switch 36 either to the delay circuit 37 at low-speed traverse time or to the delay circuit 38 at high-speed traverse time. The TZC signal thus delayed is forwarded to an edge detecting circuit 34.

The delay time of the delay circuit 37, set to address low-speed traverse operations, takes into account the delay resulting from the sampling of the mirror signal (a) by an A/D converter 31 as well as the delay stemming from the noise-reducing LPF in a mirror signal generating circuit 32. This delay time is established so as not to disturb the phase relationship between mirror signal (a) and TZC signal (c) shown in FIG. 3. On the other hand, the delay time of the delay circuit 38 is set to address high-speed traverse operations in such a manner that the TZC signal (c) will not overtake the mirror signal (a).

As described, one of the delay circuits 37 and 38 located on the output side of the TZC signal generating circuit 33 delays the TZC signal by the appropriate predetermined time prior to edge detection. This delay operation compensates for the amount of delay attributed to the delay stemming from the sampling of the mirror signal (a) by the A/D converter 31 as well as to the delay resulting from the noise-reducing LPF contained in the mirror signal generating circuit 32. The invention is particularly effective in dealing with high-speed traverse operations, allowing the count-out signal Cout to be accurately output as the track traverse detection signal. As a result, the number of tracks jumped upon access to a desired track is counted precisely. That in turn makes it possible to provide accurate track-related control functions including track indexing.

In the above embodiment, one of the two delay circuit 37 and 38 having different delay times is selected by the changeover switch 36 in accordance with traverse speed. Alternatively, a single delay circuit having a variable delay time feature may be provided whereby the delay time is varied depending on traverse speed.

Although the embodiment above is described from the viewpoint of applying the invention to the CD player, the embodiment is not limitative of the invention. The invention may also be applied to other optical disc players including video disc players.

As described, the track traverse detecting circuit according to the invention is incorporated in the digital servo apparatus of the optical disc player. In operation, the track traverse detecting circuit delays the TZC signal by the appropriate predetermined time. The mirror signal is sampled at the timing of the edges of the delayed TZC signal. The output of the sampling is provided as the count-out signal Cout. This feature compensates for the amount of delay attributed to the delay stemming from the sampling of the mirror signal as well as to the delay resulting from the noise-reducing LPF. With high-speed traverse operations adequately dealt with in this manner, the count-out signal Cout is accurately generated.

As many apparently different embodiments of this invention may be made without departing from the spirit and scope thereof, it is to be understood that the invention is not limited to the specific embodiments thereof except as defined in the appended claims.

What is claimed is:

1. A track traverse detecting circuit incorporated in a digital servo apparatus of an optical disc player, said track traverse detecting circuit comprising:
    a mirror face detecting circuit for generating a mirror face detection signal based on a read RF signal coming from an optical disc;
    a tracking zero cross detecting circuit for generating a tracking zero cross signal by detecting the zero cross timing of a tracking error signal;
    a delay circuit for delaying said tracking zero cross signal by a selected one of a plurality of fixed delay times, the selected delay time corresponding to the speed of track traverse; and
    a sampling circuit for sampling said mirror face detection signal at the timing of edges of said tracking zero cross signal having passed said delay circuit;
    wherein the output of said sampling circuit is provided as a track traverse detection signal.

2. A track traverse detecting circuit incorporated in a digital servo apparatus of an optical disc player, said track traverse detecting circuit comprising:
    a mirror face detecting circuit for generating a mirror face detection signal based on a read RF signal coming from an optical disc;
    a tracking zero cross detecting circuit for generating a tracking zero cross signal by detecting the zero cross timing of a tracking error signal;
    a delay circuit for delaying said tracking zero cross signal by a variable delay time, the delay time proportional to the speed of track traverse; and
    a sampling circuit for sampling said mirror face detection signal at the timing of edges of said tracking zero cross signal having passed said delay circuit;
    wherein the output of said sampling circuit is provided as a track traverse detection signal.

* * * * *